Aug. 3, 1954

G. C. FIELDS ET AL 2,685,288

OXYGEN REGULATING SYSTEM

Filed Nov. 17, 1949

GEORGE C. FIELDS
THOMAS H. REDDINGTON
INVENTOR.

BY Edmund W. C. Kamm
ATTORNEY

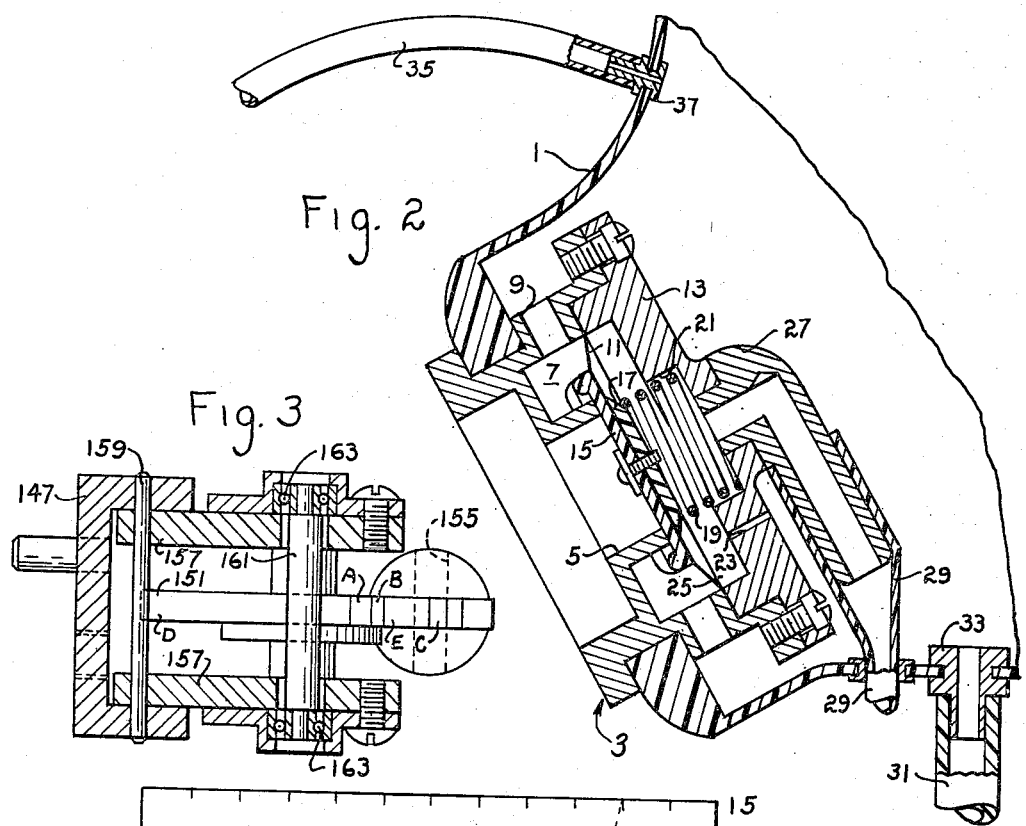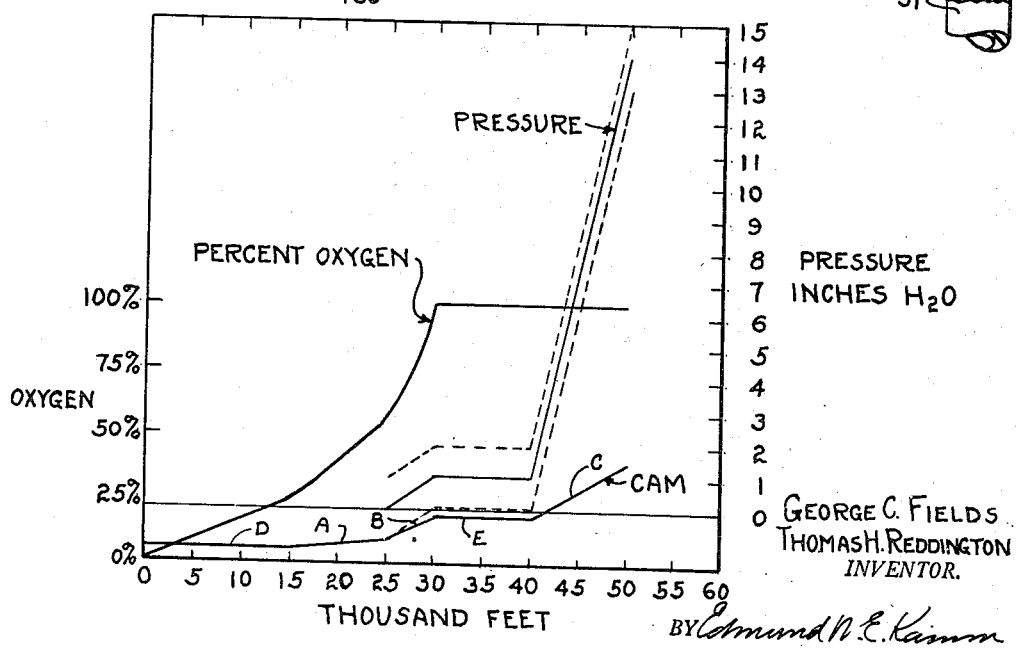

Patented Aug. 3, 1954

2,685,288

UNITED STATES PATENT OFFICE 2,685,288

OXYGEN REGULATING SYSTEM

George C. Fields, Wilmette, and Thomas H. Reddington, Chicago, Ill.; said Reddington assignor to Johnson Fare Box Company, Chicago, Ill., a corporation of Delaware Application November 17, 1949, Serial No. 127,834

13 Claims. (Cl. 128—142)

This invention relates to oxygen regulators. More specifically, it relates to an oxygen regulator which is pressure compensating and is particularly intended for high altitude flying.

It is an object of the invention to provide an oxygen regulator system which is capable of feeding varying amounts of oxygen and air to the wearer of an oxygen mask, the amount of oxygen increasing as the altitude increases until at a predetermined altitude pure oxygen is supplied and at a different predetermined altitude oxygen is maintained at a positive pressure in said mask.

A further object is to provide an oxygen regulator and mask in which the amount of positive or negative pressure required to be exerted by the wearer to operate the system never exceeds one inch of water at any altitude.

Yet another object of the invention is to provide a regulator system which is fully automatic and which requires no manual adjustments whatever throughout the entire range of its operation.

Another object of the invention is to provide a regulator system which is positive in operation yet relatively simple.

Yet a further object of the invention is to provide a mechanism which will conserve the oxygen supply.

It is another object of the invention to provide a system which can be operated with a minimum of exertion by the wearer.

Still another object is to provide a system which will operate automatically to adjust the oxygen supply as the altitude changes up and down.

A further object is to provide a system which will supply oxygen in substantial accordance with present aeromedical standards.

These and other objects of the invention will become apparent from a study of this specification and the drawings which are attached hereto, are made a part hereof and in which:

Figure 2 is a vertical sectional view of the mask showing the air inlet control valve, the exhaust control and the oxygen inlet.

Figure 3 is a sectional view taken substantially on line 3—3 of Figure 1 showing the control cam and its mounting.

Figure 4 is a graph showing generally the operation of the system.

Structure

Figure 1:
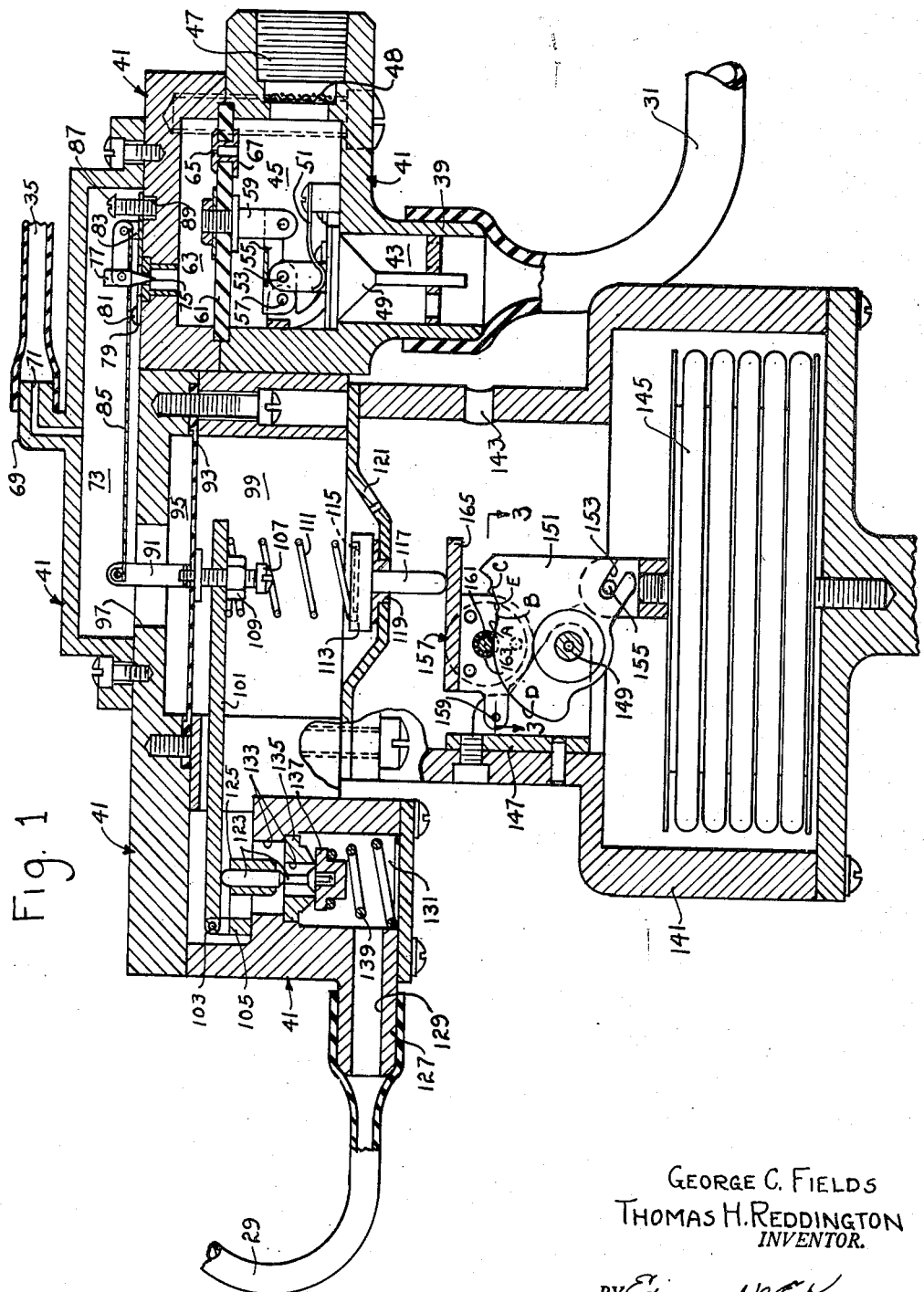
Figure 1 is a vertical sectional view of a portion of the system showing the oxygen valve, the exhaust valve, the diaphragms for operating them and also the aneroid for automatically regulating the supply of oxygen.

Referring first to Figure 2, the numeral 1 represents a face mask of any suitable gas-tight material which is provided with a fitting 3 having an air inlet port 5 which communicates with the atmosphere on the outside of the mask and opens into a chamber 7 having ports 9 communicating with the interior of the mask.

The chamber is defined in part by the fitting and in part by the diaphragm or valve operator 11 which is held in place on 3 by the case 13.

The diaphragm is provided centrally on one side with an inwardly-opening valve 15 which controls port 5. It carries a spring seat 17 centrally on the side opposite the valve.

A compression spring 19 rests on the seat 17 and in a recess 21 in case 13 and normally urges valve 15 to close port 5. The diaphragm also actuates the valve as described below.

The case 13 is provided with a small bleeder 23 which serves as a vent for chamber 25 between the diaphragm 11 and case 13. The chamber 25 and diaphragm 11 are hereinafter referred to as the valve actuator for the sake of brevity. This bleeder is preferably about .013 inch in diameter and communicates with the interior of the mask.

A metal L or conduit 27 communicates with chamber 25 and terminates in a hose 29 which is sealingly passed through the wall of the mask.

An oxygen supply hose 31 is attached to a fitting 33 fixed to the wall of the mask and a pilot control hose 35 is attached to a fitting 37 fixed in the wall of the mask. Both hoses communicate with the interior of the mask.

It should be noted that there is considerable area of the diaphragm 11 and valve 15 exposed in chamber 7.

Referring now to Figure 1, the oxygen hose 31 is attached to a boss 39 on the regulator body 41. The conduit 43 through the boss communicates with oxygen supply chamber 45 which is supplied with oxygen under about 20 p. s. i. absolute through inlet 47 and screen 48 and constitutes means for discharging oxygen from the supply into the hose 31.

Conduit 43 is closed by a downwardly acting poppet-type valve 49 which is urged toward closed position by spring 51. The valve is pivotally supported at 53 on a lever 55 which is pivoted at one end at 57. The other end of the lever is pivotally connected to a stem 59 which is mounted centrally in a diaphragm 61 which forms one wall of chamber 45.

A control chamber 63 is formed in the body 41 above the diaphragm and communication is had between this chamber and chamber 45 through the small bleeder port 65, preferably having a diameter of .006", formed in the grommet 67 fixed in the diaphragm.

The hose 35 is attached to a boss 69 on the body 41 and communicates by way of conduit 71 with a demand chamber 73 which in turn communicates with chamber 63 through a port 75 which is controlled by a needle valve 77.

A Y-shaped plate 79 straddles the port 75 and is held in place by screws 81. A pair of ears 83 rise from the plate and a lever 85 is pivoted at one end on the ears. The lever carries the needle valve 77. A screw 87 is screwed in the plate, rides in a hole 89 in the body and serves to adjust the valve relative to the seat.

The free end of lever 85 is pivotally connected to post 91 which is fixed to the central portion of a diaphragm 93. The chamber 95 above the diaphragm communicates with chamber 73 through port 97 which also passes post 91.

The chamber 99 on the other side of the diaphragm is open to atmosphere and contains a lever 101 which has one end pivoted at 103 to a bracket 105 fixed to body 41. The other end of the lever has a screw 107 threaded therein which bears against the center portion of the diaphragm 93. A lock nut 109 holds the screw in its adjusted position.

A compression spring 111 under sea level conditions has its upper end disposed adjacent the bottom side of the free end of the lever but out of contact therewith and has its other end resting upon the spring seat 113. The seat has a recess 115 formed to receive the spring and has a central plunger 117 which rides in a bushing 119 fixed in the lower wall 121 of the chamber 99.

The under side of lever 101 adjacent the pivot 103 bears on a thrust pin 123 mounted for reciprocation in guide 125 formed integral with bracket 105.

Hose 29 is fixed to a boss 127 which has a channel 129 communicating with exhaust chamber 131. The latter chamber communicates through port 133 with chamber 99.

A downwardly facing valve seat 135 is positioned adjacent the port 133 and is closed by the vertically reciprocating control valve 137 which is normally urged into contact with the seat by spring 139. The thrust pin 123 engages the valve to open it when lever 101 and pin 123 are depressed.

An aneroid housing 141 is attached to the body 41 and is vented at 143 to atmosphere. A sealed aneroid bellows 145 is mounted in the housing.

Bracket 147 mounted on the housing has pivotally mounted thereon at 149 a cam 151 which is pivotally connected by a slot 153 to a pin 155 fixed to the free end of the bellows. The cam has three rises A, B and C and two dwell or rest portions D and E.

A U-shaped cam follower lever 157 is pivotally mounted at 159 on bracket 147, carries a follower roll 161 in ball or other anti-friction bearings 163. The bar portion 165 of the lever 157 is extended to engage the plunger 117 of spring seat 113.

Operation

The system described above is intended to supply a man at all altitudes from sea level to 50,000 feet with the proper breathing atmosphere to enable him to work efficiently while, at the same time, conserving the supply of oxygen.

The chart, Figure 4, explains the approximate operation of the regulator. The rises and dwells or rests of the cam 151 are shown in the lowermost curve. Dwell D is effective until approximately 15,000 feet; rise A extends to about 25,000 feet; rise B to 30,000 feet; rest E to 40,000 feet and rise C through and beyond 50,000 feet.

The oxygen percentage curve is a straight-line, altitude curve until the rise A is reached, whereupon the rate of rise increases as a function of altitude and the rise A. When rise B is reached, the slope of the curve increases at a rate which is a function of altitude and the rise B. This curve is followed until one hundred per cent oxygen is fed, which occurs at or prior to approximately 30,000 feet at which point the curve levels off.

The remaining curve represents the static or mean pressure in the mask in inches of water. No attempt is made to show the fluctuations due to breathing. It should be understood, however, that such fluctuations will never exceed one inch of water pressure above or below this curve, as shown by the dashed lines on either side of the curve.

The rise B is effective to increase the oxygen supply between 25,000 and 30,000 feet so that at the latter altitude the mean pressure levels off at one inch of water and continues at this figure by reason of rest E until at 40,000 feet rise C becomes effective. The rise in pressure is relatively rapid and reaches 14 inches at 50,000. The rate of rise continues for altitudes beyond this but, of course, few operations are carried out above this level.

Thus the regulator supplies an increasingly enriched air supply up to approximately 30,000 feet after which it supplies all oxygen, at a positive pressure of one inch, up to 40,000 feet. Thereafter the pressure increases at a rate which will produce 14 inches at 50,000 feet. The inhalation pressure is never more than one inch and the exhalation pressure is never more than one inch above mean mask pressure throughout the entire range.

Sea level

Referring first to the operation of the device at sea level, it will be seen that the aneroid bellows will occupy their smallest compressed position so that the rest D of cam 151 will be effective and spring seat 113 will occupy its lowest position.

The lever 101 is preferably out of effective contact with diaphragm 93 under these conditions except on the exhalation cycle when the lever is operated by the diaphragm.

On the inhalation cycle person wearing the mask will, upon inhaling, slightly reduce the pressure within the mask. This reduced pressure is applied through bleeder 23 to chamber 25 and through ports 9 to chamber 7. However, since the pressure in port 5 is about 14.7 p. s. i., the reduction in pressure in the mask will need be very small, substantially only enough to overcome spring 19 which constitutes a fixed load, before the valve 15 is pushed open and the requirement for air will be satisfied.

Upon exhalation, the pressure in the mask is slightly higher than that in the port 5. The pressure is applied to chambers 7 and 25 and spring 19 overcomes the slight unbalance tending to open the valve and seats valve 15. The pressure in the mask is then applied through tube 35 to diaphragm 93 which depresses lever 101 and pin 123 to open valve 137.

The air under pressure in chamber 25 is then passed from the chamber through hose 29, chamber 131, valve 137 to atmosphere. The consequent reduction of the pressure within chamber 25 to substantially atmospheric pressure permits the super-atmospheric pressure in chamber 7 combined with the atmospheric pressure in port 5 to overcome spring 19, the valve opens and the exhalation is passed out through port 5.

Sea level to 15,000 feet

As the altitude increases progressively, the atmospheric pressure exerted in port 5 becomes less and less so that as the wearer of the mask continues to inhale normally, the valve 15 will open to a progressively less degree while valve 77 opens correspondingly to a greater degree because the suction created upon inhalation, being unsatisfied through port 5, is applied to greater degree to diaphragm 93 which opens valve 77 which supplies the deficiency by relieving pressure in chamber 63 more quickly than it can be balanced through port 65 from chamber 45.

Diaphragm 61 accordingly rises and opens valve 49 and permits oxygen to flow from chamber 45 through tube 31 into the mask to satisfy the demand. Oxygen is thus fed in increasing proportion as shown in Figure 4.

15,000 to 25,000 feet

The aneroid 145 has at the altitude of 15,000 feet or thereabout, moved the rise A on cam 151 to the position where it will pick up the follower and a further increase in altitude will raise plunger 117 and start to raise the lever 101 so that it will begin to assume the weight of the parts which are supported by the diaphragm 93. This will make the upward travel of diaphragm 93 easier with the result that valve 77, which has heretofore opened in direct ratio with the decrease in atmospheric pressure, will now open to a greater degree than that which would be induced by the decrease in atmospheric pressure. The oxygen curve (Fig. 4) accordingly has a slope which increases at a rate greater than the rate of change of altitude.

25,000 to 40,000 feet

After the cam rise A has raised the follower 157, the rise B is reached. Thus the rate of upward adjustment of lever 101 is increased for a period corresponding to the altitudes from 25,000 to 30,000 feet. The rate of increase in the percentage of oxygen is again accelerated. Somewhere at or before the latter altitude is reached, the regulator will be supplying 100% oxygen because upon inhalation the valve 77 is opened to a greater degree than heretofore and, since there is now very little pressure in port 5, the valve 15 does not open at all. By the time the end of rise B is reached and rest E is engaged, the mean or static mask pressure will be held at one inch of water. This condition is maintained until the final rise C is reached at 40,000 feet.

40,000 to 50,000 feet and over

When the aneroid reaches the 40,000 foot position, the step C of the cam contacts the follower. The step is long enough so that it imparts a regular rise to the follower from the 40,000 foot position to the 50,000 foot position and beyond.

As the spring 111 is raised progressively by the cam follower, it moves lever 101, diaphragm 93 and valve 77 to such a position that oxygen will be fed to the mask at rates sufficient to increase the oxygen pressure in the mask proportionately with increase in altitude so that at 50,000 feet the static pressure is 14 inches of water.

Constant exhalation pressure

It is desired that the amount of pressure which the wearer need exert to exhale be maintained at or below one inch of water pressure in excess of the mean or static pressure in the mask.

In order to attain this goal, the spring 111 which is raised by the aneroid as the altitude increases, is so designed that it does not require pressure of more than one inch of water applied to diaphragm 93 to compress the spring far enough to open valve 137, irrespective of the position of the cam.

The exhalation is effected at each of the various altitudes in exactly the same manner as described in the last paragraph of the section of the specification entitled "Sea Level."

As the altitude decreases, the steps and functions described above occur in the reverse order under the control of the aneroid and the changes in atmospheric pressure.

It is obvious that various changes may be made in the form, structure and arrangement of parts without departing from the spirit of the invention. Accordingly, we do not desire to be limited to the specific embodiment disclosed herein primarily for purposes of illustration; but instead, we desire protection falling fairly within the scope of the appended claims.

What we claim to be new and desire to protect by Letters Patent of the United States is:

1. In an oxygen regulating system, a mask, a chamber supported by the mask having a diaphragm as one wall, an atmospheric port in the mask adjacent the diaphragm, an inwardly opening valve carried by the diaphragm and movable therewith to open and close the port, means for applying pressure in the mask to the diaphragm on the side of said port, yieldable means for normally urging the valve closed, a restricted port in said chamber communicating with the mask, a second port in said chamber normally out of communication with the atmosphere and means responsive to exhalation pressure in the mask for connecting said second port for communication with the atmosphere to open said first port.

2. In an oxygen regulating system, a mask, a chamber supported by the mask having a diaphragm as one wall, a first atmospheric port in the mask adjacent the diaphragm, an inwardly opening valve carried by the diaphragm and movable therewith to open and close the port, means for applying pressure in the mask to the diaphragm on the side of said port, yieldable means for normally urging the valve closed, a restricted port in said chamber communicating with the mask, a second port in said chamber, a second diaphragm, means including a conduit connecting one side of said second diaphragm in communication with the interior of the mask, a channel connecting said second port to atmosphere and a valve connected for operation by said second diaphragm to open and close said channel.

3. In an oxygen regulating system, a mask, a chamber supported by the mask having a diaphragm as one wall, a first atmospheric port in the mask adjacent the diaphragm, an inwardly opening valve carried by the diaphragm and movable therewith to open and close the port, means for applying pressure in the mask to the diaphragm on the side of said port, yieldable means for normally urging the valve closed, a restricted port in said chamber communicating with the mask, a second port in said chamber, a second diaphragm, means including a conduit connecting one side of said second diaphragm in communication with the interior of the mask, a channel connecting said second port to atmosphere and a valve connected for operation by said second diaphragm, upon operation thereof by exhalation pressure in the mask, to open said channel.

4. In an oxygen regulating system, a mask, a chamber supported by the mask having a diaphragm as one wall, a first atmospheric port in the mask adjacent the diaphragm, an inwardly opening valve carried by the diaphragm and movable therewith to open and close the port, means for applying pressure in the mask to the diaphragm on the side of said port, yieldable means for normally urging the valve closed, a restricted port in said chamber communicating with the mask, a second port in said chamber, a second diaphragm, means including a conduit connecting one side of said second diaphragm in communication with the interior of the mask, a channel connecting said second port to atmosphere, a valve connected for operation by said second diaphragm, upon exhalation, to open said channel, an oxygen inlet conduit connected with the mask and including a control valve for admitting oxygen to the mask.

5. In an oxygen regulating system, a mask, an oxygen supply chamber and a control chamber separated therefrom by a diaphragm, said diaphragm having a restricted opening, an inlet for said supply chamber, an oxygen discharge port in the supply chamber, means connecting said port in communication with the mask, a valve for the port connected for operation by the diaphragm, a discharge port in the control chamber, a needle valve for controlling the port, a demand chamber communicating with the mask, a second diaphragm open to said demand chamber on one side and to atmosphere on the other and means connecting said second diaphragm to actuate said needle valve.

6. In an oxygen regulating system, a mask, an oxygen supply chamber and a control chamber separated therefrom by a diaphragm, said diaphragm having a restricted opening, an inlet for said supply chamber, an oxygen discharge port in the supply chamber, means connecting said port in communication with the mask, a valve for the port connected for operation by the diaphragm, a discharge port in the control chamber, a needle valve for controlling the port, a demand chamber communicating with the mask, a second diaphragm open to said demand chamber on one side and to atmosphere on the other, means connecting said second diaphragm to actuate said needle valve, an aneroid, a cam connected for operation by said aneroid and means, including yieldable means, for transmitting pressures from said cam to said second diaphragm in aid of the atmospheric pressure.

7. In an oxygen regulating system, a mask, an oxygen supply chamber and a control chamber separated therefrom by a diaphragm, said diaphragm having a restricted opening, an inlet for said supply chamber, an oxygen discharge port in the supply chamber, means connecting said port in communication with the mask, a valve for the port connected for operation by the diaphragm, a discharge port in the control chamber, a needle valve for controlling the port, a demand chamber communicating with the mask, a second diaphragm open to said demand chamber on one side and to atmosphere on the other, means connecting said second diaphragm to actuate said needle valve, an aneroid, a cam connected for operation by said aneroid, a follower for said cam and a compression spring connecting said follower with the atmospheric side of said second diaphragm.

8. In an oxygen regulating system, a mask, an oxygen supply chamber and a control chamber separated therefrom by a diaphragm, said diaphragm having a restricted opening, an inlet for said supply chamber, an oxygen discharge port in the supply chamber, means connecting said port in communication with the mask, a valve for the port connected for operation by the diaphragm, a discharge port in the control chamber, a needle valve for controlling the port, a demand chamber communicating with the mask, a second diaphragm open to said demand chamber on one side and to atmosphere on the other, means connecting said second diaphragm to actuate said needle valve on the inhalation portion of the cycle; an exhaust port in said mask, a third diaphragm including a valve for controlling said port, a control valve adapted to open and close, means communicating with and controlled by said control valve to actuate said third diaphragm to open and close the port, and means connecting said control valve for operation by said second diaphragm.

9. In an oxygen regulating system, a mask, an oxygen supply chamber and a control chamber separated therefrom by a diaphragm, said diaphragm having a restricted opening, an inlet for said supply chamber, an oxygen discharge port in the supply chamber, means connecting said port in communication with the mask, a valve for the port connected for operation by the diaphragm, a discharge port in the control chamber, a needle valve for controlling the port, a demand chamber communicating with the mask, a second diaphragm open to said demand chamber on one side and to atmosphere on the other, means connecting said second diaphragm to actuate said needle valve on the inhalation portion of the cycle, an exhaust port in said mask, a third diaphragm including a valve for controlling said port, a control valve adapted to open and close, means communicating with and controlled by said control valve to actuate said third diaphragm, a lever connecting said control valve with said second diaphragm, an aneroid, a cam means operated thereby and a spring confined between said cam means and lever for applying variable pressure to said second diaphragm in aid of said atmospheric pressure.

10. In an oxygen regulating system, a mask, an oxygen supply chamber and a control chamber separated therefrom by a diaphragm, said diaphragm having a restricted opening, an inlet for said supply chamber, an oxygen discharge port in the supply chamber, means connecting said port in communication with the mask, a valve for the port connected for operation by the diaphragm, a discharge port in the control chamber, a needle valve for controlling the port, a demand chamber communicating with the mask, a second diaphragm open to said demand chamber on one side and to atmosphere on the other, means connecting said second diaphragm to actuate said needle valve on the inhalation portion of the cycle, an atmospheric port in said mask, a third diaphragm adjacent thereto having a valve for controlling the port, first and second chambers on opposite sides of said third diaphragm, said first chamber being adjacent the port and in open communication with the mask, said second chamber having a restricted port to the mask and a control port, a valve disposed to open and close the control port and means connecting said valve for operation by said second diaphragm.

11. In an oxygen regulating system, a mask, an oxygen supply chamber and a control chamber separated therefrom by a diaphragm, said diaphragm having a restricted opening, an inlet for said supply chamber, an oxygen discharge port in the supply chamber, means connecting said port in communication with the mask, a valve for the port connected for operation by the diaphragm, a discharge port in the control chamber, a needle valve for controlling the port, a demand chamber communicating with the mask, a second diaphragm open to said demand chamber on one side and to atmosphere on the other, means connecting said second diaphragm to actuate said needle valve, an atmospheric port in said mask, a third diaphragm adjacent thereto having a valve for controlling the port, first and second chambers on opposite sides of said third diaphragm, said first chamber being adjacent the port and in open communication with the mask, said second chamber having a restricted port to the mask and a control port, a valve disposed to open and close the control port, means connecting said valve for operation by said second diaphragm, an aneroid, a cam connected for operation thereby and means, including a spring, connected to transmit pressure of said cam to said valve operating means and thereby to said second diaphragm in aid of said atmospheric pressure.

12. In an oxygen regulating system, a mask, an atmospheric port in the mask, a valve mounted for movement to open and close said port, an actuator for said valve, means for applying mask pressure to said actuator to close the valve, a vent for the pressure applying means, a valve to control the vent, exhalation responsive means for opening the vent valve, an aneroid and compressible means for transmitting movement of the aneroid to said responsive means in opposition to exhalation pressure, the area of said responsive means and the yieldability of said compressible means serving to open said vent valve, upon application of a pressure equal to not more than one inch of water in said mask, irrespective of the expanded condition of said aneroid.

13. In an oxygen regulating system, a mask, an atmospheric port therein, a valve for controlling the port, means responsive to exhalation pressure within the mask for opening the valve, said means being responsive to inhalation pressure within the mask for opening said valve under predetermined atmospheric pressure conditions, means disposed to control the operation of said valve opening means for decreasing the magnitude of opening of the valve as the atmospheric pressure decreases, an oxygen inlet conduit connected with said mask and control means responsive to inhalation pressure within the mask for admitting oxygen from said conduit to the mask, said control means including means responsive to decreasing atmospheric pressure for increasing the quantity of oxygen supplied.

References Cited in the file of this patent

UNITED STATES PATENTS

| Number | Name | Date |
|---|---|---|
| 439,093 | Borian | Oct. 28, 1890 |
| 851,830 | Park | Apr. 30, 1907 |
| 988,352 | Kerr | Apr. 4, 1911 |
| 1,926,069 | Sutton | Sept. 12, 1933 |
| 2,378,047 | Strange | June 12, 1945 |
| 2,384,669 | Fields | Sept. 11, 1945 |
| 2,552,595 | Seeler | May 15, 1951 |
| 2,608,971 | Holmes | Sept. 2, 1952 |

FOREIGN PATENTS

| Number | Country | Date |
|---|---|---|
| 478,412 | Great Britain | Jan. 18, 1938 |
| 645,056 | Germany | May 20, 1937 |